Patented Feb. 9, 1937

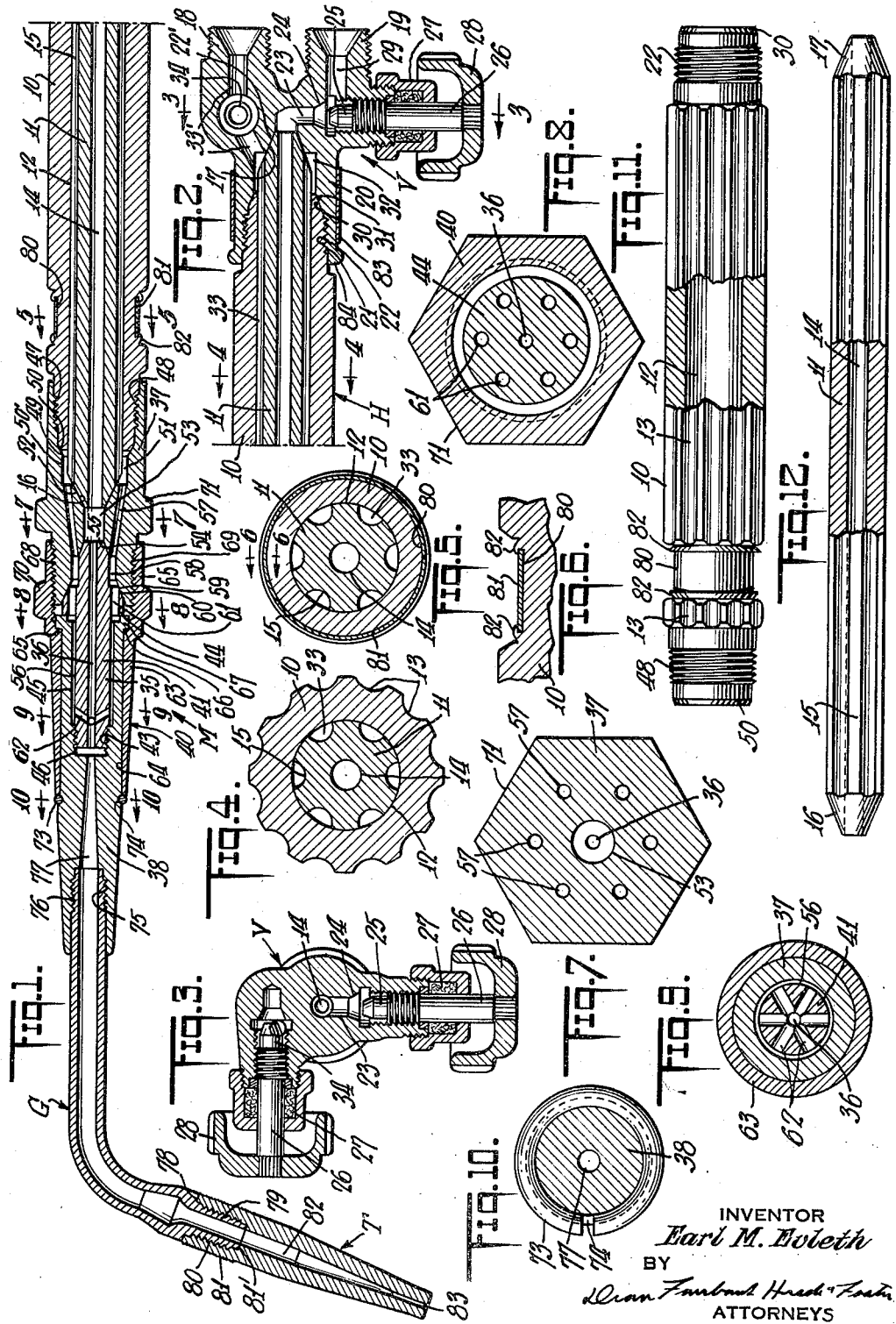

2,070,396

UNITED STATES PATENT OFFICE 2,070,396

WELDING TORCH

Earl M. Evleth, Park Ridge, Ill., assignor to The Bastian-Blessing Company, Chicago, Ill., a corporation of Illinois Application December 6, 1933, Serial No. 701,103

8 Claims. (Cl. 158—27.4)

My present invention relates to torches developing high temperatures in use and particularly to welding torches producing an oxyacetylene flame.

Objects of the invention are to provide a welding torch handle having gas conducting passageways so formed therein as to eliminate the expense involved in the present practice of drilling or boring relatively long passageways for the oxygen and acetylene, the handle yet affording a rigid, light, strong, rugged, durable, substantially solid construction and so designed that it may be comfortably gripped by the operator and conveniently manipulated to direct the flame.

Another object is to provide a handle of this character which may be assembled with expedition and facility and which may be attached with ease both to the valve body construction through which the gases flow into one end of the handle and with equal ease to the gas mixing portion of the torch into which gas flows from the opposite end of the handle.

Another object is to provide a torch of the character described which will be highly resistant to corrosion. More specifically the handle and valve body are preferably die-pressed or forged or drawn from an aluminum or other light weight alloy possessing (in the case of aluminum alloys) exceptional tensile strength (typically in excess of fifty-five thousand pounds per square inch). These parts are chemically treated to create a definite depth of aluminum oxide or alumina, rendering them corrosion resistant. The films thus formed on the outside of the handle and valve body are preferably stained black to produce an ebony-like finish which materially enhances the appearance of the torch.

Another object is to provide a torch handle and associated valve construction by which welded or soldered joints are entirely eliminated and accurately seating surfaces provide gas tight seals at the various joints. The elimination of welding is of particular importance because the hardness and tensile strength of the aluminum alloys is primarily controlled by a heat treating process which involves accurate temperature regulation and the subsequent welding tends to destroy the desirable effect of the previous heat treatment and consequently weaken the material.

Another feature of the invention is the provision of means for attaching the name plate whereby the use of screws or rivets is avoided but the name plate is securely locked in position, preferably in an annular groove in the torch handle.

A further object of the invention is to improve the construction and simplify the manufacture of the goose-necked tube commonly employed for attachment to the tips or nozzles of such torches. It has previously been proposed to thread the tips to the ends of the tubes and seat them upon an enlarged shoulder to form a gas tight joint. The usual method is to provide a tube of sufficient wall thickness to permit machining of the shoulder but this increases the cost of the material and the weight of the torch.

Another method previously proposed has been to use a relatively light weight tube and provide an internal shoulder of narrow cross sections which will readily break down under the alternate expansion and contraction always experienced at the tip of the welding torch. Another previously proposed method is to machine the parts for a tight thread fit but with this method, leaks rapidly develop in the surfaces.

By the present invention I overcome the difficulties and the expense of such prior constructions by using a tube having a relatively light weight wall section and obtain the necessary seating shoulder by upsetting the tube end in a forming die, thus permitting gas tight connection of the tube and tip when the tip is screwed onto the end of the tube without any danger of breakdown due to alternate expansion and contraction while effecting a substantial saving of material and of weight.

The invention may be more fully understood from the following description in connection with the accompanying drawing wherein:

Fig. 1 is a view in longitudinal section through my improved torch but with one end of the handle and the valving arrangement omitted, Fig. 2 is a view constituting an extension of the right hand end of Fig. 1 showing the rest of the handle and the valve body which is attached thereto, Fig. 3 is a vertical sectional view on the line 3—3 of Fig. 2, Fig. 4 is a transverse sectional view on the line 4—4 of Fig. 2, Fig. 5 is a transverse sectional view on the line 5—5 of Fig. 1, Fig. 6 is an enlarged sectional detail on the line 6—6 of Fig. 5, Figs. 7, 8, 9 and 10 are transverse sectional views taken respectively on the lines 7—7, 8—8, 9—9 and 10—10 of Fig. 1, Fig. 11 is a view mainly in plan but partly in section of the outside member of my improved handle, and Fig. 12 is a similar view showing the inside handle section which is adapted to be press fitted into the outer section of Fig. 11.

Referring first in a general way to the drawing, I have used the reference character V to indicate the valve body through which the combustible gases, usually oxygen and acetylene are admitted to the torch. The handle H which is used to manipulate the tool serves to convey these gases in unmixed condition into a mixing portion of the torch indicated at M from whence the combustible mixture passes to and through goosenecked tube G and thence to the tip T, combustion occurring as these gases are emitted from the tip.

The handle of the torch comprises an outer handle section 10 and an inner handle section 11. The handle member 10 is of elongated tubular construction having a cylindrical passageway 12 of uniform cross sectional shape, extending throughout its length, such passageway being reamed to a size which permits a tight press fit with the inner handle member 11. The intermediate portion of the handle section 10 is externally fluted or ribbed as indicated at 13 so that it may be comfortably gripped and manipulated.

The inner handle section 11 has a longitudinal passageway 14 of uniform cross section extending throughout the entire length thereof. That portion of the inner handle section which lies within the outer handle section is drawn with a series of flutes 15 which serve as gas passageways when the inner handle section is press fitted into the outer handle section.

The inner handle section at its ends is provided with machined tapered faces 16 and 17, the purpose of which will more fully hereinafter appear. Both the handle sections and the valve body which is attached to the inlet end of the handle are formed of an aluminum or other light weight alloy of ultimate tensile strength in the order of fifty-five thousand pounds per square inch and the metal of both the handle and the valve are chemically treated in any suitable manner to produce a definite depth of aluminum oxide or alumina on the surface thereof to render them corrosion resistant. Preferably also the alumina film is stained black to produce the desired ebony-like finish for the purpose of enhancing the appearance of the torch handle.

The valve body at one side presents a pair of laterally extending externally threaded nipples 18 and 19 over which are adapted to be screwed the hose couplings (not shown) for the hose lines which conduct oxygen and acetylene to the torch.

The opposite side of the valve body includes a cylindrical extension 20 the mouth of which is internally threaded at 21 for engagement with an externally threaded reduced portion 22 of the outer handle section. The valve body may be screwed home upon the outer handle section to an extent limited by the abutment of the conically tapered end 17 of the inner handle section with a correspondingly tapered recess 22' in the valve body which recess communicates with a passageway 23 having a valve seat 24 therein. A valve 25 coacting with this seat has a stem 26 extending through a suitable stuffing box 27 and manipulated by a handle 28. The adjustment of this valve with respect to its seat regulates the flow of acetylene from a passageway 29 in the nipple 19 to the passageway 23 from which the acetylene gas flows through central bore of the inner handle member. Preferably the extremity of the reduced end of the outer handle member is provided with a shoulder 30 tapered at the same angle as 17 and abutting a correspondingly tapered shoulder 31 arranged within cylindrical extension 20 of the valve body but sufficiently remote from the tapered seat 22' to provide cooperatively with part of the valve body extension 20, an annular chamber 32 for the reception of oxygen from which chamber the oxygen flow through the passageways 33 cooperatively defined by the cylindrical inner wall member 10 and by the flutes of the member 11. The oxygen passageway 33' through which the oxygen passes from the nipple 18 to the chamber 32 is controlled by a valve 34 which as best seen in Fig. is identical in construction and operation with the valve 25 previously described.

The mixer core 35 has a central passageway 36 therethrough axially aligned with passageway 14 of the inner handle member. This core is housed in a pair of axially aligned housing members 37 and 38 which are coupled together by the mixer nut 40, the housing 38 and the nut 40 conjointly forming an extension member, and the housing 37 serving as a connecting member detachably secured to said extension member and to the handle. Core housing member 37 is attached to the handle and core housing member 38 is attached to the goose-necked tube G which carries the tip T.

The mixer housing member 37 has an elongate recess in one end, this recess being internally threaded at 47 to screw over the threaded end 4 of the outer handle member 10. Inwardly beyond its threaded portion 47 this recess has an inwardly tapered shoulder 49 for abutment with the correspondingly tapered shoulder 50 (following the angle of taper 16) at the end of the outer handle member. Inwardly of this shoulder the recess again becomes cylindrical at 50' providing an annular oxygen chamber 51 into which the oxygen flowing through the passageways 33 is driven. Inwardly beyond the shoulder which defines the end of the oxygen chamber 51, the recess in the member 37 is tapered as at 52 to snugly engage with the conical end 16 of the inner handle member 11.

Member 37, together with the handle H and valve body V constitute an assembly unit adapted to be coupled to the mixing and discharge end of the torch by the nut 40.

The mixer core or body member is substantially similar to that disclosed in my copending application Serial No. 668,216 filed April 27, 1933. It consists of a highly heat conductive tube 41 having a central passageway 36 therethrough and having a reduced threaded end 43. An annular enlargement 44 of the tube 41 abuts against the flat larger end of the tapered core housing member 38, the main body of the mixer lying within a cylindrical axial recess 45 of member 38, which recess has a further reduced threaded inner end 46 into which the end 43 of the mixer core is screwed.

The acetylene gas passes from the passageway 14 into the passageway 36 through a central bore 53 in member 37, this bore communicating at one end with the tapered portion 52 of the socket 37 and at its other end communicating with the tapered portion 54 of a shorter recess in the opposite end of the housing 37. Taper 54 fits snugly against tapered end 55 of the tubular portion 41 of the mixing core 35.

The tube 41 cooperates with the cylindrical portion 45 of the recess in the mixing core casing section 38 to define an annular chamber 56 of extremely narrow cross section and of substantial length. The oxygen is conducted from chamber 50' to the flashback extinguishing chamber 56 through inclined passageways 57 which are drilled in the member 37 in an annular series about the bore 53. These passageways terminate in an annular chamber 58 cooperatively defined by the tube 41 and the member 37. The member 37 is bevelled as at 59 to engage with the bevelled or tapered face 60 of the enlargement 44 of the mixing core and through this enlargement are drilled an annular series of openings 61 through which oxygen passes from the chamber 58 into chamber 56 and leaving chamber 56 through a plurality of inwardly extending, slightly inclined ports 62 where it mixes with the acetylene.

The nut 40 which couples the two housing sections 37 and 38 and the mixer core together, includes an internally cylindrical portion 63 encircling an externally cylindrical portion 64 of the core housing section 38, the cylindrical portion 63 being enlarged as at 65 to afford an abutment for shoulder 66 formed by flange 67, projecting outwardly from one end of the section 38.

This internally enlarged portion of the nut or coupling sleeve 40 is internally threaded as at 68 for engagement with the externally threaded reduced portion 69 of the member 37. Wrench receiving means in the form of flanges of polygonal external shape are provided both on the nut 40 and on the section 38 to which it is coupled, these wrench receiving extensions being numbered 70 and 71 respectively.

The section 37 beyond the cylindrical portion 64 is externally tapered as indicated at 62 and the nut or coupling sleeve 40 is slipped over the tapered end of this section until it abuts the shoulder 65 whereupon it is secured by a split retaining ring 73 preferably of resilient material snapped into place behind it within a groove 74 in the outer surface of the member 37.

By virtue of this arrangement it will be apparent that the valve and the handle member and the section 37 may be assembled as a unit. The section 38, the mixer core and the nut 40 may be assembled as a unit, and the two units coupled together by screwing the section 37 into the threaded recess in the end of the nut until the various tapered surfaces have come into firm contact with each other to provide gas-tight seals.

The threaded end 75 of the goose-necked tube G is screwed into a suitable threaded recess 76 in the tapered end of the mixer core housing section 38, the mixed oxygen and acetylene flowing into the goose-necked tube through an expanding passageway 77 which connects the socket 46 with the bore of the goose-necked tube. The other end of the goose-necked tube G is provided with an external annular shoulder 78 formed by upsetting the tube end in a forming die. Beyond this shoulder the reduced end of the tube G is threaded as at 79 for engagement with the internally threaded end 80 of the torch tip T.

Preferably the tip is knurled or otherwise roughened at 81 at the region around its threaded socket portion 80 so that it may be screwed tightly home against the shoulder 78 manually or by use of an ordinary wrench. Preferably the end of the threaded extension 79 of the goose-necked tube terminates short of an internal shoulder 81 formed within the tip T, the passageway 82 through the tip terminating as a relatively minute orifice 83 at which the combustion of the mixture of oxygen and acetylene occurs.

As pointed out in the Evleth application above identified, the mixer is effective to extinguish flashbacks, due first to the minute cross sectional area of the oxygen chamber 56 and secondly due to the fact that the mixer core is in intimate contact at a great number of places with the highly conductive metal of the two core housing sections 37 and 38. When a flashback occurs, part of the flame will be immediately extinguished in the oxygen chamber and the heat of the flame will be so quickly dissipated by thermal conduction that the temporarily retarded gases flowing through the mixing core will have insufficient heat to support combustion.

Any tendency of the flashback flame to penetrate the acetylene passage back of the ports 62 will be ineffective because of the fact that the acetlyene itself will not contain sufficient oxygen to support combustion and any oxygen attempting to enter through the ports 62 will be temporarily blown back by the flashback.

Considerable difficulty has heretofore been experienced in permanently attaching a name plate or identification plate to the torch due to the necessity for using screws or rivets. As clearly illustrated in Figs. 1 and 6, I have provided an annular groove 80 in the outer surface of the outer handle section 10, and a bendable name plate 81 may be wrapped around this handle within the groove and permanently retained therein by the expedient of upsetting the metal of the handle section at 82 so that it overlaps both edges of the plate.

The material of the torch head is preferably Monel which is considerably harder than aluminum or other light metal alloys used in the production of the handle section and the valve body. Stainless steel or a suitable type of hard bronze may be substituted for Monel if desired.

Having thus described my invention, what I claim as new and desire to secure by Letters Patent, is:

1. In a torch, a handle including an inner member and an outer member each having a longitudinal bore therethrough and each being externally fluted, the inner member being tightly fitted into the outer member, the flutes of the outer member affording a gripping surface and the flutes of the inner member cooperating with the wall of the bore of the outer member to define gas passageways, a valve body screwed onto one end of the outer member and having a taper fit with the projecting end of the inner member, said valve body having passageways communicating respectively with the central bore of the inner member and with the passageways defined by the flutes of the inner member, valves controlling the passageways in the valve body, the inlet ends of said passageways terminating at nipples integral with the body adapted for attachment to gas supply lines.

2. A torch having a handle including an inner member and an outer member each having a longitudinal bore therethrough and each being externally fluted, the inner member being tightly fitted into the outer member, the flutes of the outer member affording a gripping surface and the flutes of the inner member cooperating with the wall of the bore of the outer member to define gas passageways, a valve body detachably secured to one end of the outer handle portion and having a taper fit with the end of the inner member, said valve body having passageways communicating respectively with the central bore of the inner member and with the passageways defined by the flutes of the inner member, the valves controlling the inlet ends of said passageways in said valve body terminating at nipples adapted for attachment to gas lines, the valve body and the inner and outer members of the handle being formed of an aluminum alloy of high tensile strength, the surfaces of said handle sections and said body being rendered corrosion resistant and the exposed corrosion resistant surfaces being stained to simulate an ebony finish.

3. A torch having a handle including an inner member and an outer member, each member having a central longitudinal bore, flutes on the exterior of said inner member cooperating with the wall of the bore of the outer member to form a plurality of passages, and a pair of members secured to opposite ends of said outer member, and having seating engagement with the opposite ends of said inner member, and each having separate passages, one communicating with the bore of said inner member and the other with the passages between said flutes.

4. A torch having a handle including an inner member and an outer member, each member having a central longitudinal bore, flutes on the exterior of said inner member cooperating with the wall of the bore of the outer member to form a plurality of passages, and a pair of members secured to opposite ends of said outer member and having seating engagement with the opposite ends of said inner member, and each having separate passages, one communicating with the bore of said inner member and the other with the passages between said flutes, one of said pair of members having nipples for the attachment of separate gas conduits, and the other of said pair of members constituting a mixing chamber housing.

5. A torch having a handle including an outer tubular member and an inner tubular member in said outer member, said inner member having frusto-conical seats at its ends, and flutes on its exterior cooperating with the wall of the outer member to form a plurality of passages, and a pair of members threaded onto the opposite ends of said outer member and provided with sockets adapted to receive and seat on the ends of said inner member, each of said pair of members having a central passage registering with the bore of the inner member, and a second passage communicating with the passages between the flutes on the inner member.

6. A torch including a handle comprising an outer handle section having a bore of uniform cross-section throughout, and an inner section having a central bore and straight parallel flutes on the exterior thereof, extending the full length thereof, and tightly fitted into said bore, said flutes cooperatively defining with the outer section gas passageways, and a valve body secured to one end of the outer handle section, and seating on the end of the inner handle section, said valve body having passageways communicating respectively and directly with the central bore of the inner handle section, and with said gas passageways.

7. A torch including a handle comprising an outer handle section having a bore of uniform cross-section throughout, and an inner section having a central bore and straight parallel flutes on the exterior thereof, extending the full length thereof and tightly fitted into said bore, said flutes cooperatively defining with the outer section gas passageways, a valve body secured to one end of the outer handle section, and seating on the end of the inner handle section, said valve body having passageways communicating respectively and directly with the central bore of the inner handle section, and with said gas passageways, and a mixing chamber at the other end of said handle, and having separate passages communicating with said bore of said inner section and said gas passageways respectively.

8. A torch having a handle including an outer tubular section and an inner tubular section, means within said outer section for holding said sections in spaced concentric relationship, said sections having separate frusto-conical seats on each end thereof, the seats on the ends of the inner section being at the same angle as and in alignment with the seats on the adjacent ends of the outer section, and a pair of members, each having separate sealing engagement with seats on one end of both of said sections, and each of said members having a pair of passages, one communicating with the interior of the inner section and the other with the annular space between said sections.

EARL M. EVLETH.